US011216637B2

United States Patent
Gao et al.

(10) Patent No.: US 11,216,637 B2
(45) Date of Patent: Jan. 4, 2022

(54) OPTICAL FINGERPRINT RECOGNITION DEVICE AND DISPLAY DEVICE

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN); Pengcheng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 539 days.

(21) Appl. No.: 16/316,448

(22) PCT Filed: Apr. 23, 2018

(86) PCT No.: PCT/CN2018/084098
§ 371 (c)(1),
(2) Date: Jan. 9, 2019

(87) PCT Pub. No.: WO2019/041839
PCT Pub. Date: Mar. 7, 2019

(65) Prior Publication Data
US 2021/0334506 A1    Oct. 28, 2021

(30) Foreign Application Priority Data
Aug. 31, 2017  (CN) .......................... 201710774892.4

(51) Int. Cl.
*G06K 9/00* (2006.01)
*G02B 6/42* (2006.01)
*G06K 9/20* (2006.01)

(52) U.S. Cl.
CPC ........... *G06K 9/00046* (2013.01); *G02B 6/42* (2013.01); *G02B 6/4215* (2013.01);
(Continued)

(58) Field of Classification Search
CPC ............ G06K 9/00046; G06K 9/2036; G06K 9/0004; G02B 6/4215; G02B 6/42; G02B 6/4298
See application file for complete search history.

(56) References Cited

U.S. PATENT DOCUMENTS 4,728,186 A * 3/1988 Eguchi ............... G06K 9/00899
356/71
5,448,659 A 9/1995 Tsutsui et al.
(Continued)

FOREIGN PATENT DOCUMENTS

| CN | 104751121 A | 7/2015 |
| CN | 105260708 A | 1/2016 |
| CN | 107527039 A | 12/2017 |

OTHER PUBLICATIONS

International Search Report and Written Opinion dated Jul. 23, 2018.

*Primary Examiner* — Abhishek Sarma
(74) *Attorney, Agent, or Firm* — Dilworth & Barrese, LLP.; Michael J. Musella, Esq.

(57) ABSTRACT

An optical fingerprint recognition device and a display device are disclosed. The optical fingerprint recognition device includes: a light source; a light guide plate including two light guide surfaces parallel to each other; a first volume grating, a second volume grating, respectively provided on one of the two light guide surface; and a light detector. The light detector is provided at a side of the light guide plate away from the second volume grating and configured to detect intensity distribution of the light exported by the second volume grating. The first volume grating is configured to import light emitted by the light source into the light guide plate. The light guide plate is configured to perform total reflection to the light imported into the light guide
(Continued)

plate. The second volume grating is configured to export light propagated in the light guide plate.

19 Claims, 4 Drawing Sheets

(52) U.S. Cl.
CPC ......... *G02B 6/4298* (2013.01); *G06K 9/0004* (2013.01); *G06K 9/2036* (2013.01)

(56) References Cited

U.S. PATENT DOCUMENTS

| | | | | |
|---|---|---|---|---|
| 5,732,148 A | * | 3/1998 | Keagy ................ | G06K 9/00046 356/71 |
| 2011/0063077 A1 | * | 3/2011 | Jung .................. | G06K 9/00046 340/5.83 |

* cited by examiner

OPTICAL FINGERPRINT RECOGNITION DEVICE AND DISPLAY DEVICE

CROSS REFERENCE TO RELATED APPLICATIONS

The application claims priority to Chinese patent application No. 201710774892.4, filed on Aug. 31, 2017, the entire disclosure of which is incorporated herein by reference as part of the present application.

TECHNICAL FIELD

Embodiments of the present disclosure relate to an optical fingerprint recognition device and a display device.

BACKGROUND

With the development of fingerprint recognition technologies, the fingerprint recognition technologies have been widely applied in many fields, such as electronic equipment terminals such as mobile phones, tablet computers and TV, and an entrance guard and a safe and so on in a security protection system. Main implementations to acquire a fingerprint include optical, capacitive and ultrasonic imaging technologies, in which optical fingerprint recognition technology has a relatively large recognition range and relatively low cost.

At present, the optical fingerprint recognition technologies used by liquid crystal displays (LCDs) and mobile terminals such as mobile phones are still immature. Usually, fingerprint imaging based on diffusion light are realized with a backlit panel and an optical imaging device, and the principle is that the light emitted by the backlit, as a light source, illuminates the finger and imaging is realized by diffuse reflecting the light into an image detector.

SUMMARY

The embodiments of the present disclosure provide an optical fingerprint recognition device and a display device, so as to improve the accuracy of fingerprint recognition.

In one aspect, the embodiments of the present disclosure provide an optical fingerprint recognition device, which includes a light source, a light guide plate, a first volume grating, a second volume grating and a light detector. The light guide plate comprises two light guide surfaces which are parallel to each other; the first volume grating and the second volume grating are respectively provided on one of the two light guide surfaces of the light guide plate; the light source is provided at a side of the light guide plate away from the first volume grating; the light detector is provided at a side of the light guide plate away from the second volume grating; the first volume grating is configured to import light emitted by the light source into the light guide plate; the light guide plate is configured to perform total reflection to the light imported into the light guide plate; the second volume grating is configured to export light propagated in the light guide plate; the light detector is configured to detect intensity distribution of the light exported by the second volume grating.

In another aspect, the embodiments of the present disclosure provide a display device, which includes a display panel and the above-mentioned optical fingerprint recognition device, and the optical fingerprint recognition device is provided at a light-exiting side of the display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The term "stripe" in the present disclosure is a specific region or a specific portion in a volume grating. For example the refractive index of the material in the region or the portion is greater than the refractive index of the material in other region or portion.

The embodiments of the present disclosure provide an optical fingerprint recognition device and a display device, so as to increase the accuracy of fingerprint recognition.

Figure 1:
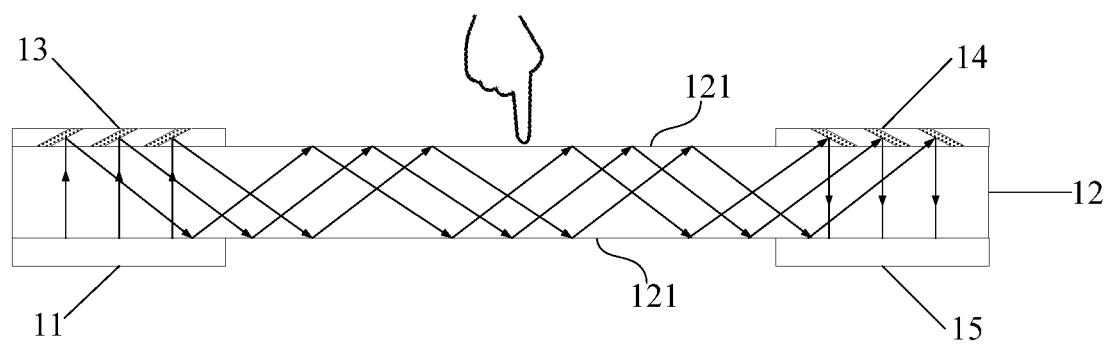
FIG. 1 is a schematically structural view of an optical fingerprint recognition device provided by an embodiment of the present disclosure.

As illustrated in FIG. 1, the optical fingerprint recognition device provided by the embodiments of the present disclosure includes: a light source 11, a light guide plate 12, a first volume grating 13, a second volume grating 14 and a light detector 15. As illustrated in FIG. 1, the light guide plate 12 includes two light guide surfaces 121 parallel to each other; the first volume grating 13 and the second volume grating 14 are respectively provided on one of the light guide surfaces 121 of the light guide plate 12; the light source 11 is provided at the side of the light guide plate 12 away from the first volume grating 13; the light detector 15 is provided at the side of the light guide plate 12 away from the second volume grating 14. The first volume grating 13 is configured to import light emitted by the light source 11 into the light guide plate 12. The light guide plate 12 is configured to perform total reflection to the light imported into the light guide plate 12; the second volume grating 14 is configured to export light propagated in the light guide plate 12; the light detector 15 is configured to detect the intensity distribution of the light exported by the second volume grating 14.

During preforming fingerprint recognition, a finger to be detected is in direct contact with the light guide surface 121 of the light guide plate 12 (as illustrated in FIG. 1, in direct contact with the upper surface of the light guide plate), the light detector 15 identifies the fingerprint of the finger to be detected through detecting the intensity distribution of the light exported by the second volume grating 14.

Optical fingerprint recognition capabilities in related technologies normally adopt the back light of a display device as a light source, diffuse reflection occurs when the back light is incident onto the finger, and the fingerprint can be identified through collecting the intensity distribution of the diffuse reflection light of the finger. The identification of a fingerprint by a detection system is difficult because of the following reasons: the energy of the diffuse reflection light detected by the detector is significantly low; the difference between the light energy corresponding to the fingerprint valley (referred to as valley in the following) of the finger and the light energy corresponding to the fingerprint ridge (referred to as ridge in the following) of the finger is also small; and interference to the diffuse reflection light from other light in the display device is existed. Therefore, the accuracy of fingerprint recognition is low.

In view of this, the embodiments of the present disclosure provide the above-mentioned optical fingerprint recognition device, and a light guide plate is adopted as a light transmission device. In the case where the finger is in contact with the light guide surface of the light guide plate, the light reflection is present at the light guide surface of the light guide plate and the difference between the energy of the light reflected by the region, which is corresponding to the valley, of the light guide surface and the energy of the light reflected by the region, which is corresponding to the ridge, of the light guide surface is large, this is because the difference between the refractive index of the valley of the finger and the refractive index of the light guide plate is different from the difference between the refractive index of the ridge of the finger and the refractive index of the light guide plate. Therefore, the identification of the valley and the ridge of the finger can be realized through detecting the intensity distribution of the light which is propagated in the light guide plate and influenced by the finger. Compared with the fingerprint recognition in related technologies, the accuracy of the fingerprint recognition by determining the intensity distribution corresponding to the fingerprint, obtained through detecting the reflection light within the light guide surface, is high, this is because the reflection light within the light guide surface is significantly larger than the diffuse reflection light of the finger and is not easy to subject to the interference from ambient light, and the difference between the light energy corresponding to the valley of the fingerprint and the light energy corresponding to the ridge of the fingerprint is increased.

Furthermore, the above-mentioned optical fingerprint recognition device provided by the embodiments of the present disclosure adopts the first volume grating as a light import device, and adopts the second volume grating as a light export import device. For example, the volume grating structure is an optical Bragg grating, and the optical Bragg grating is a transparent device with periodical refractive index change, and the reflectivity of the optical Bragg grating in a wavelength range around a certain wavelength is large. In the case where the wavelength of incident light satisfies the Bragg condition, the wave number of the grating is matched with the difference between the wave number of the incident light and the wave number of the refection light, and the light with other wavelengths is almost unaffected by the Bragg grating. The above-mentioned optical fingerprint recognition device provided by the embodiments of the present disclosure has a relatively large diffraction efficiency by adopting the above-mentioned volume grating structure as a light import device and a light export device, this is because only one diffraction order is present and zero order diffraction is not existed compared with conventional gratings, as long as the incident angle is satisfied and the wavelength is within corresponding wavelength range. In addition, reflection light with different angles can be obtained through adjusting the surface inducing refractive index change during fabricating the volume grating structure, while the overall dimensions of the volume grating can be remain unchanged. Therefore, the setting position can be flexibly chosen according to actual demands while ensuring the flatness of the device.

In at least some embodiments, the refractive index of the light guide plate 12 is smaller than the refractive index of the finger to be detected. When the finger touches the light guide surface 121 of the light guide plate 12, the refractive index of the ridge, which in contact with the light guide surface, is greater than the refractive index of the light guide plate, and therefore, the light propagated in the light guide plate can be reflected and refracted at the above-mentioned contacting interface, this causes the reflectivity of the propagated light is smaller than 100%. At the region, which is corresponding to the valley of the finger, of the light guide surface 121, the valley is not in contact with the light guide surface 121 of the light guide plate 12, this is equivalent to the case that the region of the light guide surface is in contact with air (the refractive index of the light guide plate is greater than the refractive index of air), and therefore, the propagated light incident onto the region is incident from an optically dense medium to an optically thinner medium, and thus light total reflection is present, and the reflectivity is approximately 100%. By this way, the reflectivity of the region, which is corresponding to the valley of the finger, of the light guide surface to the propagated light is different from the reflectivity of the region, which is corresponding to the ridge of the finger, of the light guide surface to the propagated light. Therefore, the energy difference of the reflected light is present, and thus the valley and the ridge of the fingerprint can be identified through the brightness distribution of the light received by the light detector. Furthermore, the refractive index of the light guide plate may also slightly greater than the refractive index of the finger to be detected, as long as the refractive difference between the ridge of the fingerprint and the light guide plate allows the total reflection of the light guide plate to be non-existed. Therefore, in actual implementation, suitable material may be adopted to fabricate the light guide plate provided that the refractive index of the finger is known, and no limitations will be given to the material of the light guide plate here.

In at least some embodiments, the light source may be a collimated light source. The light emitted by the collimated light source is parallel light, and is incident into the light guide plate 12, and in this case, the light guide plate 12 is further configured to import the parallel light incident onto the light guide plate 12 into the first volume grating 13. Adopting of the collimated light source is in favor of adjusting the incident angle of the light emitted by the light source with respect to the first volume grating. When the entire incident light is incident onto the first volume grating with the same incident angle, the utilization rate of the emitted light by the first volume grating is increased.

Figure 2A:
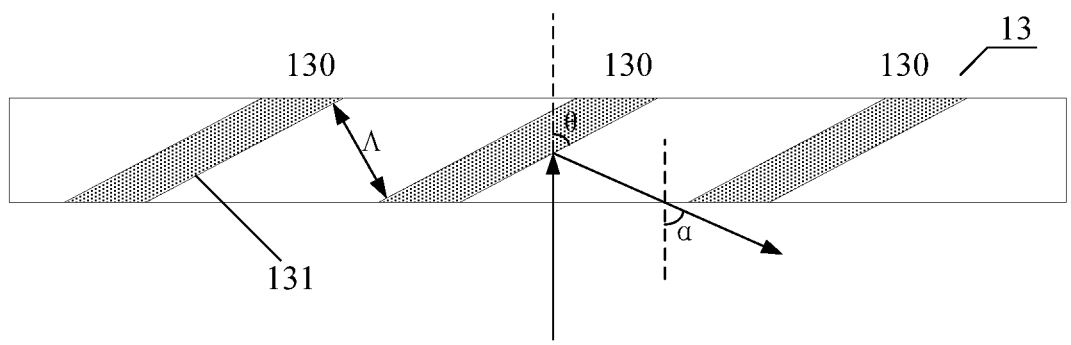
FIG. 2a is a schematically structural view of a volume grating provided by an embodiment of the present disclosure.
Figure 2B:
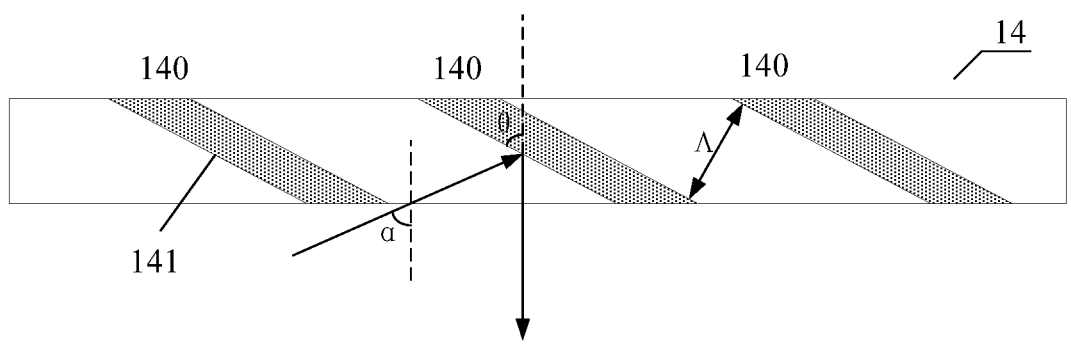
FIG. 2b is a schematically structural view of another volume grating provided by an embodiment of the present disclosure.
Figure 8:
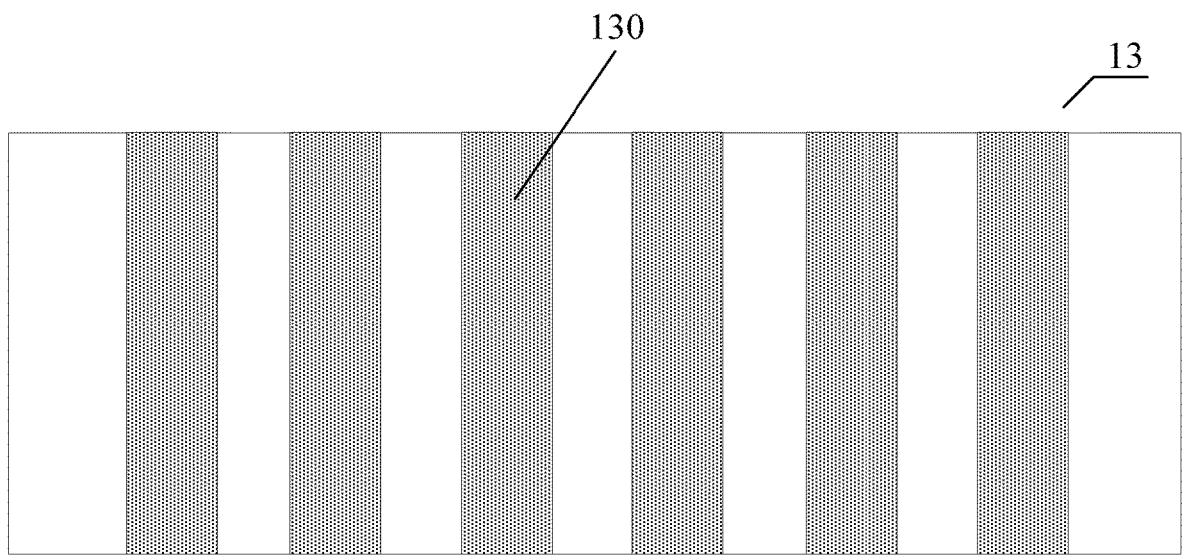
FIG. 8 is a plan view of a volume grating provided by an embodiment of the present disclosure.

In at least some embodiments, the first volume grating 13 and the second volume grating 14 may be a cuboid structure, FIG. 2a and FIG. 2b are cross-sectional views of the first volume grating 13 and the second volume grating 14, and the cross-sectional views is perpendicular to the light guide surface. FIG. 2a is a schematically structural view of the first volume grating 13 as illustrated in FIG. 1, and FIG. 8 is a plan view of the first volume grating 13. The first volume grating 13 includes a plurality of first stripes 130 parallel to each other, and each of the first stripes includes a first reflective surface 131. The first reflective surface 131 is inclined with respect to the interface between the first volume grating 13 and the light guide plate 12, so as to allow light reflected by the first reflective surface 131 to be propagated in the light guide plate 12 by way of total reflection. The refractive index of the material of the first stripe is different from the refractive index of the material of other portion (also referred to as the refractive index of medium) of the first volume grating. For example, the refractive index of the material of the first stripe is greater than the refractive index of the medium of the first volume grating. As illustrated in FIG. 2a, the incident light can be effectively reflected in the case where the reflective surface 131 is provided at the angular bisector of the angle between the incident light and the exit light, and therefore, the propagation direction of the incident light can be changed. In the case that the light emitted by the light source is incident onto the first volume grating 13 with a pre-determined angle, the first volume grating 13 can import the light into the light guide plate 12 with a determined angle, and the light is allowed to be propagated in the light guide plate based on total reflection in the case where the propagation angle of the imported light is greater than or equal to total reflection angle of the light guide plate.

The second volume grating 14 and the first volume grating have the same structure. For example, FIG. 2b is a schematically structural view of the second volume grating 14 as illustrated in FIG. 1, the second volume grating 14 includes a plurality of second stripes 140 parallel to each other, and each of the second stripes 140 includes a second reflective surface 141. The second reflective surface 141 is inclined with respect to the interface between the second volume grating 14 and the light guide plate 12, so as to allow light reflected by the second reflective surface 141 to exit along the direction perpendicular to the interface between the second volume grating 14 and the light guide plate 12. The refractive index of the material of the second stripe is different from the refractive index of the material of other portion (also referred to as the refractive index of the medium) of the second volume grating. For example, the refractive index of the material of the second stripe is greater than the refractive index of the medium of the second volume grating. As illustrated in FIG. 2b, the incident light can be effectively reflected in the case where the reflective surface 141 is provided at the angular bisector of the angle between the incident light and the exit light, and therefore, the propagation direction of the incident light can be changed. In the case where the light propagated in the light guide plate is incident onto the second volume grating 14 with the angle which is determined in the above-mentioned descriptions (greater than or equal to the total reflection angle), the second volume grating 14 can export the light from the light guide plate 12, and then the light detector 15 collects the exported light and the fingerprint can be identified according to the light intensity distribution.

Furthermore, the refractive index of the light guide plate, the refractive index of the medium of the first volume grating 13, and the refractive index of the medium of the second volume grating 14 are the same, in this way, the light can be propagated along a straight line when the light travels through the interface between the light guide plate and the first volume grating, and when the light travels through the interface between the light guide plate and the second volume grating, and thus no reflection or refraction is occurred and the light loss is reduced.

Figure 4:
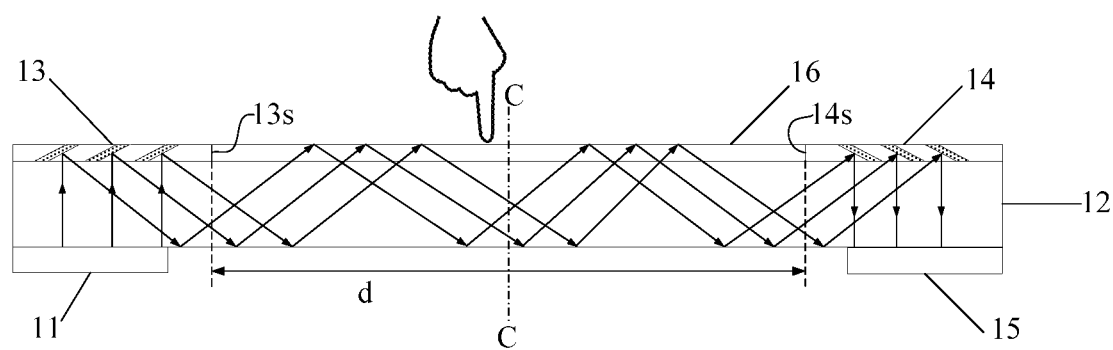
FIG. 4 is a schematically structural view of an optical fingerprint recognition device provided by further another embodiment of the present disclosure.

Furthermore, the inclination direction of the reflective surface of the first volume grating 13 and the inclination direction of the reflective surface of the second volume grating 14 may be determined according to the positions of the first volume grating 13 and the second volume grating 14. In an implementation, as illustrated in FIG. 1, both the first volume grating 13 and the second volume grating 14 are provided at the same light guide surface of the light guide plate 12 (as illustrated in FIG. 1, both the first volume grating 13 and the second volume grating 14 are provided at the upper surface of the light guide plate 12). In this case, as illustrated in FIG. 1, the first volume grating 13 and the second volume grating 14 may respectively provide at two ends, which are opposite to each other, of the light guide plate 12, and the plurality of the reflective surface 131 of the first volume grating 13 and the plurality of the reflective surface 141 of the second volume grating 141 are mirror symmetrical with respect to a perpendicular bisector. As illustrated in FIG. 4, the perpendicular bisector CC is a perpendicular bisector of a line segment b between two side surfaces 13s and 14s, which are opposite to each other, of the first volume grating 13 and the second volume grating 14. In the present embodiment, the perpendicular bisector CC may also be the perpendicular bisector of the light guide surface 121. The first volume grating 13 and the second volume grating 14 can be a symmetrical structure by allowing the first volume grating 13 and the second volume grating 14 to be provided at the same light guide surface of the light guide plate 12, and thus the reflective angle of the light at each interface also satisfies a symmetry rule. For example, as illustrated in FIG. 1, when the light is incident onto the first volume grating 13 perpendicularly, after propagating in the light guide plate, the light exported by the second volume grating 14 also propagates in the direction perpendicular to the second volume grating 14. In this case, the light detector 15 can be right opposite to the second volume grating 14, as long as the collimated light source 11 is right opposite to the first volume grating.

Figure 3:
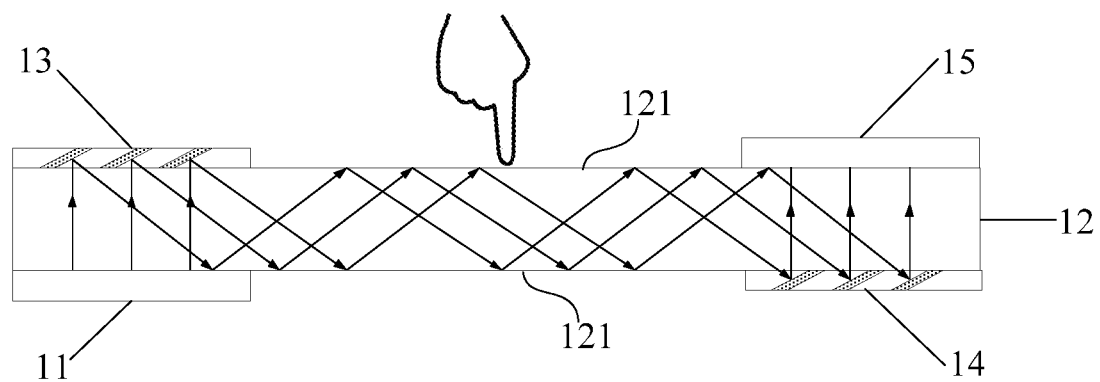
FIG. 3 is a schematically structural view of an optical fingerprint recognition device provided by another embodiment of the present disclosure.

In another implementation, as illustrated in FIG. 3, the first volume grating 13 and the second volume grating 14 are respectively provided at two light guide surface, which are opposite to each other, of the light guide plate (as illustrated in FIG. 3, the first volume grating 13 is provided at the upper surface of the light guide plate 12, and the second volume grating 14 is provided at the low surface of the light guide plate 12); in this case, as illustrated in FIG. 3, each of the reflective surfaces 131 of the first volume grating 13 and each of the reflective surfaces 141 of the second volume grating 14 are parallel to each other. In the present disclosure, two volume grating structures with identical structure may be used as the first volume grating 13 and the second volume grating 14, so as to simplify the arrangements.

Furthermore, in the above-mentioned optical fingerprint recognition device provided by the embodiments of the present disclosure, as illustrated in FIG. 1 and FIG. 3, the thickness of the first volume grating 13 and the thickness of the second volume grating 14 may be the same, the manufacturing parameters can be simplified during manufacturing process and the planeness of the fingerprint recognition device can be guaranteed, in the case where the thickness of the first volume grating 13 and the thickness of the second volume grating 14 are set to be the same.

For example, both the thickness of the first volume grating and the thickness of the second volume grating may set to be in the range of 5-20 µm. In the case where the thickness of the volume grating structure is too large, the light reflected by the reflective surface can be incident onto another reflective surface adjacent to the reflective surface, this adversely impact the importation of the light into the light guide plate and the exportation of the light from the light guide plate. In the case where the thickness of the volume grating structure is too small, the reflective surface may only reflect a small portion of the light emitted by the light source, and this reduces the light utilization rate of the light emitted by the light source. Therefore, in order to maximize the light utilization rate of the light emitted by the light source, it appropriate to set the thickness of the first volume grating 13 and the thickness of the second volume grating 14 to be in the range of 5-20 µm.

In at least some embodiments, in the above-mentioned optical fingerprint recognition device provided by the embodiments of the present disclosure, in the case where the first volume grating 13 and the second volume grating 14 is provided at the same light guide surface of the light guide plate, as illustrated in FIG. 4, the optical fingerprint recognition device may further includes a protective film layer 16, and the protective film layer 16, the first volume grating 13, and the second volume grating 14 are provided at the same light guide surface of the light guide plate 12, and the protective film layer 16 is provided between the first volume grating 13 and the second volume grating 14. For example, the protective film layer 16, the first volume grating 13 and the second volume grating 14 have the same thickness. The planeness of the entire optical fingerprint recognition device can be improved by forming the light import device and the light export device on the same film layer.

Furthermore, according to the above-mentioned principle, the refractive index of the protective film layer 16 may be set to be equal to the refractive index of the light guide plate 12. In the case where the refractive index of the protective film layer 16 is equal to the refractive index of the light guide plate 12, no light refraction is occurred at the interface between the protective film layer 16 and the light guide plate 12, and the light reflection rule for the case that the finger touches the protective film layer 16 is similar to the light reflection rule for the case that the finger touches the structure as illustrated in FIG. 1, and no further description will be given here.

Specific descriptions of the principle of the optical fingerprint recognition will be described in the following with reference to the structure of the optical fingerprint recognition device as illustrated in FIG. 1.

As mentioned above, both the reflective surface 131 of the first volume grating 13 and the reflective surface 141 of the second volume grating 14 are inclined with respect to the light guide surface of the light guide plate 12, and the reflective surface 131 of the first volume grating and the reflective surface of the second volume grating are mirror symmetrical with respect to the perpendicular bisector CC. In the following, both the propagation direction of the incident beam and the propagation direction of the exit beam are vector directions.

As illustrated in FIG. 2a, a is the angle between the exit beam of the first volume grating 13 and the normal direction of the light-exiting surface of the first volume grating 13, θ is the angle between the incident angle and the reflective surface 131, and the following equation may be obtained.

$$\theta = \frac{\pi - \alpha}{2}.$$

According to the property of the volume grating structure, the wavelength λ of the incident light emitted by the light source, the angle θ between the incident angle and the reflective surface 131, and the distance Λ between adjacent reflective surfaces 131 have to satisfy Bragg's law, that is, 2 nΛ sin θ=λ, in which n is the refractive index of the medium of the first volume grating.

The first volume grating, which is used as the light import device, may import the collimated light incident onto the first volume grating into the light guide plate 12 by refection of the reflective surface 131, and thus the collimated light can be propagated in the light guide plate 12 based on total reflection. The critical angle of total reflection of the light guide plate 12 is C, and the following equation may be obtained.

$$C = \arcsin\frac{1}{n}.$$

In the case where the angle α≥C, the imported light can be propagated in the light guide plate 12 based on total reflection. When the angle α is given, the distance Λ between adjacent reflective surfaces 131 of the volume grating structure and the angle θ can be designed.

The second volume grating, which is used as the light export device, may export the light propagated in the light guide plate 12 and allow the light to be collected by the detector, and the structure of the second volume grating is symmetrical with respect to the light import device.

An example of a manufacturing method of the volume grating with an inclination angle of the reflective surface with respect to the light guide surface being equal to (90°-θ) is given in the following.

During manufacturing the volume grating, allowing two plane wave type light beams to illuminate and exposure a photorefractive material at two sides of the photorefractive material. The propagation directions of the two plane wave type light beams are respectively the propagation direction of the incident light and the propagation direction of the exit light. The two plane wave type light beams interfere with each other and forms three-dimensional interference fringes in the photorefractive material, that is, the grating reflective surfaces of the volume grating in the present embodiment, the photorefractive material with the grating reflective surfaces formed is the above-mentioned volume grating. The refractive index of the material of the fringes in the volume grating is greater than the refractive index of the material in other region of the volume grating. Here, the photorefractive material is a material with an ability to have a changed refractive index after light exposure. For example, the photorefractive material may include materials such as an iron-copper-doped lithium-niobate crystal, but the embodiments of the present disclosure are not limited to this case.

Figure 5:
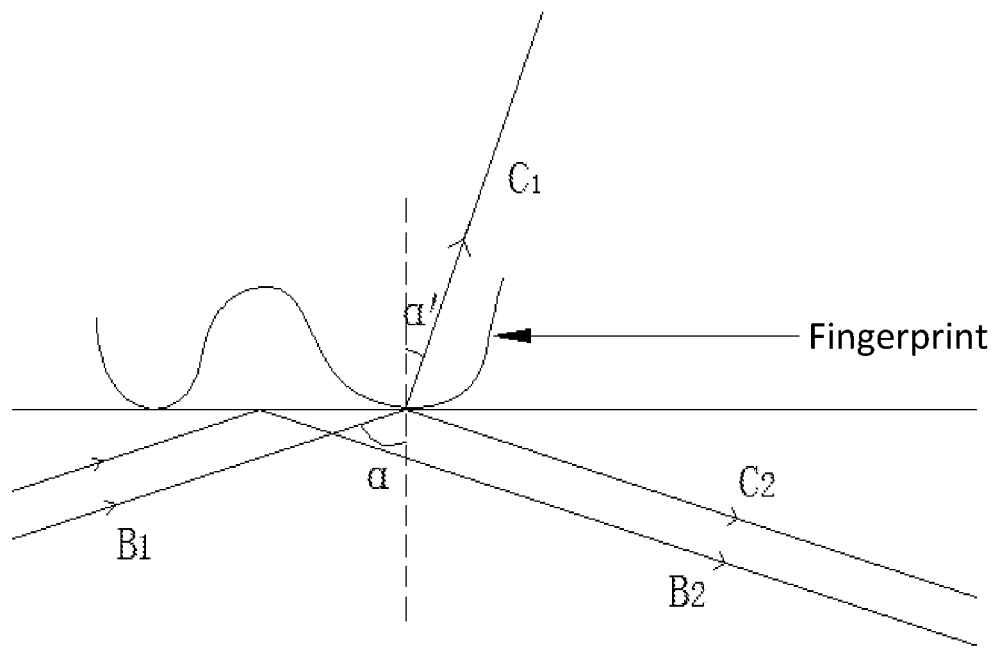
FIG. 5 is an illustrative diagram of an optical fingerprint recognition device provided by an embodiment of the present disclosure.

Furthermore, during performing fingerprint recognition, as illustrated in FIG. 5, the finger touches the upper surface of the light guide plate. The refractive index n of the human skin satisfies n'=1.55, and thus is greater than the refractive index of the light guide plate (the refractive index n of the light guide plate is set to be 1.5). In the case where the light is incident from the light guide plate onto the position corresponding to the ridge of the fingerprint, it equivalent to be the case that the light is incident from an optically thinner medium (the glass of the light guide plate) onto an optically dense medium (the skin of the finger), and thus no total reflection is present at the position corresponding to the ridge, and thus refraction and reflection is present, and the refraction light and reflection light are respectively denoted as C1 and C2 and the refraction angle is denoted as α'. In the case where the light is incident from the light guide plate onto the position corresponding to the valley of the fingerprint, it equivalent to be the case that the light is incident from an optically dense medium (the glass of the light guide plate) onto an optically thinner medium (air), and therefore, total reflection is present, and only reflection beam B2 is generated. Because the reflectivity of the beam B2 is approximately equal to 100%, and the reflectivity of the beam C2 is smaller than 100%, the intensity of the beam B2 is greater than the intensity of the beam C2, and the intensity difference between the light reflected by the position corresponding to valley and the light reflected by the position corresponding to the ridge is received by the light detector and the intensity distribution can be identified, and therefore, the fingerprint recognition function can be realized.

The calculation equation of the reflectivity of the reflection beam C2 is given in the following.

$$\rho = \frac{1}{2}\left[\frac{\sin^2(\alpha - \alpha')}{\sin^2(\alpha + \alpha')} + \frac{\tan^2(\alpha - \alpha')}{\tan^2(\alpha + \alpha')}\right].$$

In which, α is an incident angle, α' is a refraction angle, n and n' are refractive indexes of two media related to the interface reflection, and incident angle and the refraction angle are satisfy the refraction law.

n sin α=n' sin α'.

The reflectivity of the beam C2 at different incident angle may be calculated based on the above-mentioned two equations. For example, in the case where α=50°, p=0.03%, and the intensity of the beam C2 is negligible compared with the intensity of the beam B2, and therefore, the intensity of the beam B2 is significantly larger than the intensity of the beam C2, the intensity difference between the light reflected by the position corresponding to valley and the light reflected by the position corresponding to the ridge is received by the light detector and the intensity distribution can be identified, and thus the fingerprint recognition with high accuracy can be realized.

Figure 6:
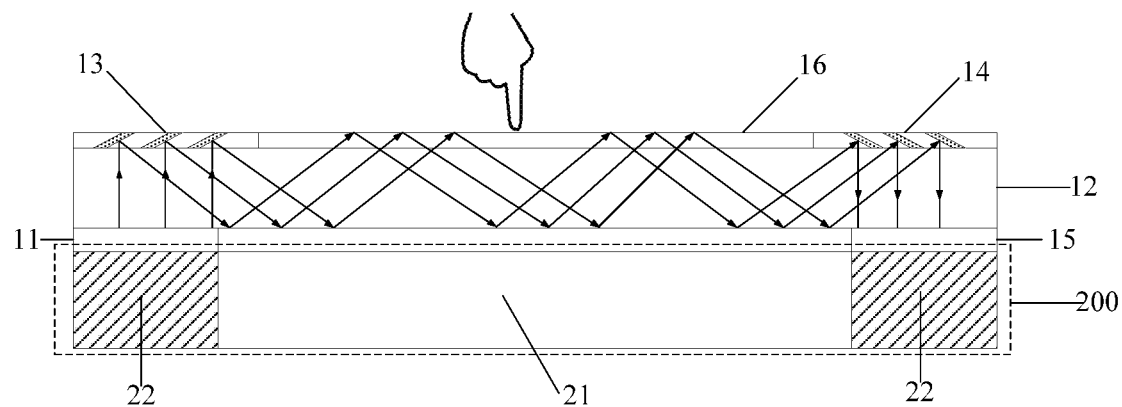
FIG. 6 is a schematically structural view of a display device provided by an embodiment of the present disclosure.

The embodiments of the present disclosure further provides a display device, as illustrated in FIG. 6, the display device includes a display panel 200, and the optical fingerprint recognition device is provided at the light-exiting side of the display panel, the optical fingerprint recognition device is any one of the above-mentioned optical fingerprint recognition devices provided by the embodiments of the present disclosure. The display device may be a liquid crystal display device, an organic light-emitting diode (OLED) display device, an electronic paper, and so on, and the display device may also be a mobile phone, a tablet, a notebook and other mobile devices.

Furthermore, in the above-mentioned display device provided by the embodiments of the present disclosure, as illustrated in FIG. 6, the display panel 200 may include a display region 21 and a non-display region 22 around the display region. All the light source 12, the first volume grating 13, the second volume grating 14 and the light detector 15 included by the optical fingerprint recognition device may be provided at corresponding positions in the non-display region 22 of the display panel, so as to allow orthographic projections of the above-mentioned elements on the display panel is within the non-display region 22, such that shielding of the outputted light of the display panel by non-transparent element (for example, the light source 12, the light detector 15) of the optical fingerprint recognition device is avoided, and adverse effect of the first volume grating 13 and the second volume grating 14 to the outputted light of the display panel can also be avoided.

Figure 7:
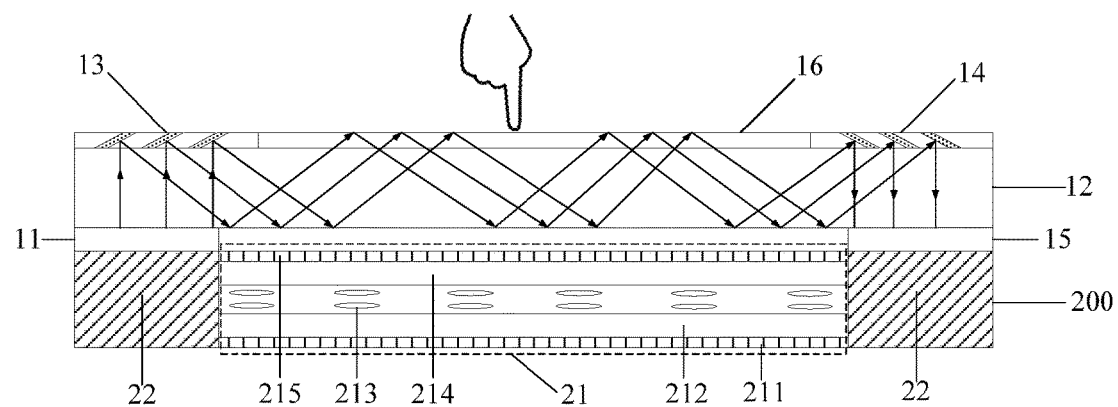
FIG. 7 is a schematically structural view of a liquid display device provided by an embodiment of the present disclosure.

The display device provided by the embodiments of the present disclosure may be a liquid crystal display device, as illustrated in FIG. 7, in the case where the display device is the liquid crystal display device, the liquid crystal display panel, for example, may include: a lower polarizer 211, an array substrate 212, a liquid crystal layer 213, a color film substrate 214 and an upper polarizer 215. In addition, the display panel may also be an OLED display panel, and the specific structure of the OLED display panel is similar to the structure of related OLED display panels, and no further descriptions will be given here.

Furthermore, in the above-mentioned display device provided by the embodiments of the present disclosure, the wavelength of the light emitted by the light source 12 of the optical fingerprint recognition device is in infrared range. Adoption of collimated light source in infrared range may avoid adverse effect to normal display of the display panel in the case where light leakage of the surface touched by the finger is present.

When adopting the optical fingerprint recognition device and the display device provided by the embodiments of the present disclosure to perform fingerprint recognition, the finger to be detected touches the light guide surface of the light guide plate, the light detector identifies the fingerprint of the finger to be detected through detecting the intensity distribution of the light exported by the second volume grating. The accuracy of the fingerprint recognition by determining the intensity distribution corresponding to the fingerprint, obtained through detecting the light reflected by the light guide surface in contact with the finger, is high because of the following reasons: the reflection light within the light guide surface is significantly larger than the diffuse reflection light of the finger; the reflection light is not easy to subject to the interference from ambient light; the difference between the light energies corresponding to the rise and fall of the fingerprint is more apparent.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness of a layer or area may be enlarged or narrowed, that is, the drawings are not drawn in a real scale.

(3) In case of no conflict, features in one embodiment or in different embodiments can be combined to obtain new embodiments.

What is described above is related to the illustrative embodiments of the disclosure only and not limitative to the scope of the disclosure; the scopes of the disclosure are defined by the accompanying claims.

What is claimed is:

1. An optical fingerprint recognition device, comprising:
a light source, a light guide plate, a first volume grating, a second volume grating and a light detector,
wherein the light guide plate comprises two light guide surfaces which are parallel to each other;
the first volume grating and the second volume grating are respectively provided on one of the two light guide surfaces of the light guide plate; the light source is provided at a side of the light guide plate away from the first volume grating; the light detector is provided at a side of the light guide plate away from the second volume grating;
the first volume grating is configured to import light emitted by the light source into the light guide plate;
the light guide plate is configured to perform total reflection to the light imported into the light guide plate;
the second volume grating is configured to export light propagated in the light guide plate; and
the light detector is configured to detect light intensity distribution of the light exported by the second volume grating.

2. The optical fingerprint recognition device according to claim 1, wherein refractive index of the light guide plate is smaller than refractive index of a finger to be detected.

3. The optical fingerprint recognition device according to claim 1, wherein the light source is a collimated light source and the light source is configured to emit parallel light to be imported into the light guide plate.

4. The optical fingerprint recognition device according to claim 3, wherein the light guide plate is further configured to import the parallel light into the first volume grating.

5. A display device, comprising a display panel and the optical fingerprint recognition device according to claim 1, wherein the optical fingerprint recognition device is provided at a light-exiting side of the display panel.

6. The display device according to claim 5, wherein all of orthographic projections of the light source, the first volume grating, the second volume grating, and the light detector of the optical fingerprint recognition device are within a non-display region of the display panel.

7. The display device according to claim 6, wherein wavelength of the light emitted by the light source of the optical fingerprint recognition device is in infrared range.

8. The optical fingerprint recognition device according to claim 1, wherein the first volume grating comprises a plurality of first stripes parallel to one another; and each of the first stripes comprises a first reflective surface, the first reflective surface is inclined with respect to an interface between the first volume grating and the light guide plate, so as to allow light reflected by the first reflective surface to be propagated in the light guide plate by way of total reflection.

9. The optical fingerprint recognition device according to claim 8, wherein refractive index of a material of the first stripe of the first volume grating is greater than refractive index of a material of other portion of the first volume grating.

10. The optical fingerprint recognition device according to claim 8, wherein the second volume grating comprises a plurality of second stripes parallel to each other; and each of the second stripes comprises a second reflective surface, and the second reflective surface is inclined with respect to an interface between the second volume grating and the light guide plate, so as to allow light reflected by the second reflective surface to propagate along a direction perpendicular to the interface between the second volume grating and the light guide plate.

11. The optical fingerprint recognition device according to claim 1, wherein a thickness of the first volume grating is equal to a thickness of the second volume grating.

12. The optical fingerprint recognition device according to claim 11, wherein both the thickness of the first volume grating and the thickness of the second volume grating are in a range of 5 μm to 20 μm.

13. The optical fingerprint recognition device according to claim 1, wherein the second volume grating comprises a plurality of second stripes parallel to each other; and each of the second stripes comprises a second reflective surface, and the second reflective surface is inclined with respect to an interface between the second volume grating and the light guide plate, so as to allow light reflected by the second reflective surface to propagate along a direction perpendicular to the interface between the second volume grating and the light guide plate.

14. The optical fingerprint recognition device according to claim 13, wherein refractive index of a material of the second stripe of the second volume grating is greater than refractive index of a material of other portion of the second volume grating.

15. The optical fingerprint recognition device according to claim 13, wherein both the first volume grating and the second volume grating are provided at same one light guide surface of the light guide plate; and
the plurality of first reflective surfaces of the first volume grating and the plurality of second reflective surfaces of the second volume grating are mirror symmetrical with respect to a perpendicular bisector, and the perpendicular bisector is a perpendicular bisector of a line segment between two side surfaces of the first volume grating and the second volume grating which are opposite to each other.

16. The optical fingerprint recognition device according to claim 15, further comprising a protective film layer,
wherein the protective film layer, the first volume grating, and the second volume grating are provided on the same one light guide surface, and the protective film layer is provided between the first volume grating and the second volume grating.

17. The optical fingerprint recognition device according to claim 16, wherein the protective film layer, the first volume grating, and the second volume grating have same thickness.

18. The optical fingerprint recognition device according to claim 16, wherein refractive index of the protective film layer is equal to the refractive index of the light guide plate.

19. The optical fingerprint recognition device according to claim 13, wherein the first volume grating and the second volume grating are respectively provided on the two light guide surfaces of the light guide plate; and
 each of the first reflective surfaces of the first volume grating is parallel to each of the second reflective surfaces of the second volume grating.

* * * * *